United States Patent
Kwon

(10) Patent No.: US 9,187,048 B2
(45) Date of Patent: Nov. 17, 2015

(54) METHOD OF MOUNTING CABLE ON HEADLINER AND HEADLINER USED THEREFOR

(71) Applicant: DAEHAN SOLUTION CO., LTD, Incheon (KR)

(72) Inventor: Choong Ho Kwon, Seoul (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 0 days.

(21) Appl. No.: 13/948,784

(22) Filed: Jul. 23, 2013

(65) Prior Publication Data

US 2015/0165984 A1    Jun. 18, 2015

(30) Foreign Application Priority Data

Apr. 10, 2013    (KR) .......................... 10-2013-0039028

(51) Int. Cl.
*B60R 13/02* (2006.01)
(52) U.S. Cl.
CPC .................................. *B60R 13/0212* (2013.01)
(58) Field of Classification Search
CPC .... B60R 13/08; B60R 13/0212; B62D 25/06; B32B 37/14
See application file for complete search history.

(56) References Cited

U.S. PATENT DOCUMENTS

| | | | | |
|---|---|---|---|---|
| 2003/0218364 A1* | 11/2003 | Glunk et al. | .................. | 296/214 |
| 2004/0016565 A1* | 1/2004 | Gallant et al. | ............. | 174/117 F |
| 2005/0098454 A1* | 5/2005 | Gallant et al. | ............. | 206/308.1 |
| 2005/0170743 A1* | 8/2005 | Wells | ............................ | 446/227 |

* cited by examiner

*Primary Examiner* — Lori L Lyjak
(74) *Attorney, Agent, or Firm* — Bacon & Thomas, PLLC

(57) ABSTRACT

A method of mounting a cable on a headliner and a headliner used therefor, that are capable of simplifying an attachment process by attaching the cable to the headliner using an attaching cloth, and preventing the attached cable from being easily separated from the headliner and securely fixing the cable to reduce generation of noises. The method is capable of easily recognizing a cable mounting position and arbitrarily adjusting the cable mounting position to a width of an attaching cloth. A worker may easily perform an assembly process by attaching the cable using the attaching cloth, separating an incorrectly attached cable and then attaching the cable thereto again.

The attaching cloth may be at a mounting position of a headliner opposite to a roof panel and at which a cable is mounted, and at an outer circumferential surface of the cable, respectively.

11 Claims, 4 Drawing Sheets

METHOD OF MOUNTING CABLE ON HEADLINER AND HEADLINER USED THEREFOR

CROSS-REFERENCE TO RELATED APPLICATION

This application claims priority to and the benefit of Korean Patent Application No. 10-2013-0039028, filed Apr. 10, 2013, the disclosure of which is incorporated herein by reference in its entirety.

BACKGROUND

1. Field of the Invention

The present invention relates to a method of mounting a cable on a headliner and a headliner used therefor, and more particularly, to a method of mounting a cable on a headliner and a headliner used therefor, in which the cable is mounted on the headliner using an attaching cloth having hook and loop fasteners, which is referred to as a VELCRO, to enable easy mounting and change a mounting position to enable re-mounting thereof.

2. Discussion of Related Art

In general, as shown in FIG. 1, a roof panel R of a vehicle includes a headliner H/L formed at an inner side thereof to provide a shock-absorbing function, a mood, or the like. The headliner H/L is fixedly installed at a side roof rail by a clip, and formed by stacking various materials such as vinyl, cotton, or the like to function as an insulating material against a temperature change from the outside.

Korean Patent Application Laid-Open No. 10-2010-0035324 discloses a novel headliner wire fixing method, as shown in FIG. 2, capable of securely fixing an electric wire and increasing a working efficiency. In such a fixing method, an upper surface of a strip-shaped cover sheet 10 formed of a non-woven fabric material is ultrasonic-welded to a headliner 1 formed of a non-woven fabric material to fix an electric wire 2, improving an adhesive force between the cover sheet 10 and the headliner 1 to securely fix the electric wire 2 fixed by the cover sheet 10 and reducing a working time to improve a working efficiency.

Meanwhile, the electric wire fixing method also uses a fixing method of applying hot melt and attaching a cable thereon using a robot or the like. In case of the fixing method, a noise pad is further attached on the cable to prevent a direct contact between a roof panel and the cable.

However, when the cable is fixed to the headliner through fusion or using an adhesive agent, the following problems occur.

(1) Since the noise pad should be added to fix the cable after the cable is attached on the headliner, simple works should be repeated.

(2) When a cable attaching position is incorrect, the headliner may not be assembled onto the roof panel. In this case, it is cumbersome to separate the cable attached to the headliner and then fuse or attach the cable thereto again. Of course, when the cable is securely attached thereto, since the cable cannot be separated from the headliner, the headliner may be wasted.

(3) For this reason, an operator who attaches the cable to the headliner should have skillfulness of a certain level or more with respect to a corresponding work.

(4) When an attachment area of the cable to the headliner is separated, the cable comes in direct contact with the roof panel to cause noises in the inside of the vehicle.

SUMMARY OF THE INVENTION

In order to solve the problems, the present invention provides a method of mounting a cable on a headliner and a headliner used therefor, that are capable of simplifying an attachment process by attaching the cable to the headliner using an attaching cloth having hook and loop fasteners, which is referred to as a VELCRO tape, and preventing the attached cable from being easily separated from the headliner and securely fixing the cable to reduce generation of noises.

In particular, the present invention also provides a method of mounting a cable on a headliner and a headliner used therefor, that are capable of easily recognizing a cable mounting position and arbitrarily adjusting the cable mounting position to a width of an attaching cloth having a band shape using the attaching cloth installed at the headliner.

In addition, the present invention also provides a method of mounting a cable on a headliner and a headliner used therefor, that are capable of allowing an unskilled worker to easily perform an assembly process by attaching the cable using the attaching cloth, and separating an incorrectly attached cable from the headliner and then attaching the cable thereto again.

In order to accomplish the object, the present invention is directed to providing a method of mounting a cable on a headliner, including: preparing attaching clothes at a mounting position of a headliner opposite to a roof panel and at which a cable is mounted, and at an outer circumferential surface of the cable, respectively; and attaching and mounting the attaching cloth installed at the cable onto the attaching cloth installed at the headliner.

In particular, the attaching cloth installed at the headliner may be a planar attaching cloth, and the attaching cloth installed at the cable may be a circular attaching cloth configured to surround an outer surface of the cable.

In addition, the attaching cloth installed at the headliner may be a female attaching cloth, and the attaching cloth installed at the cable may be a male attaching cloth.

Further, the attaching cloth installed at the headliner may be a male attaching cloth, and the attaching cloth installed at the cable may be a female attaching cloth.

Finally, the present invention is also directed to providing a headliner on which a cable is mounted through the method.

BRIEF DESCRIPTION OF THE DRAWINGS

The above and other objects, features and advantages of the present invention will become more apparent to those of ordinary skill in the art by describing in detail example embodiments thereof with reference to the attached drawings, in which.

DETAILED DESCRIPTION OF EXAMPLE EMBODIMENTS

Hereinafter, an exemplary embodiment of the present invention will be described in detail with reference to the accompanying drawings. Terms used herein and the following claims should not be construed as being limited to conventional or dictionary definitions but as meanings and concepts coinciding with the technical spirit of the present invention based on the principle that the inventor could appropriately define concepts of the terms to describe the best mode of the invention.

Accordingly, it will be appreciated by those skilled in the art that the detailed description given herein with respect to these figures is for explanatory purposes as the invention extends beyond these limited embodiments, and various equivalents, modifications, and variations may be made in these embodiments without departing from the principles and spirit of the general inventive concept.

Figure 1:
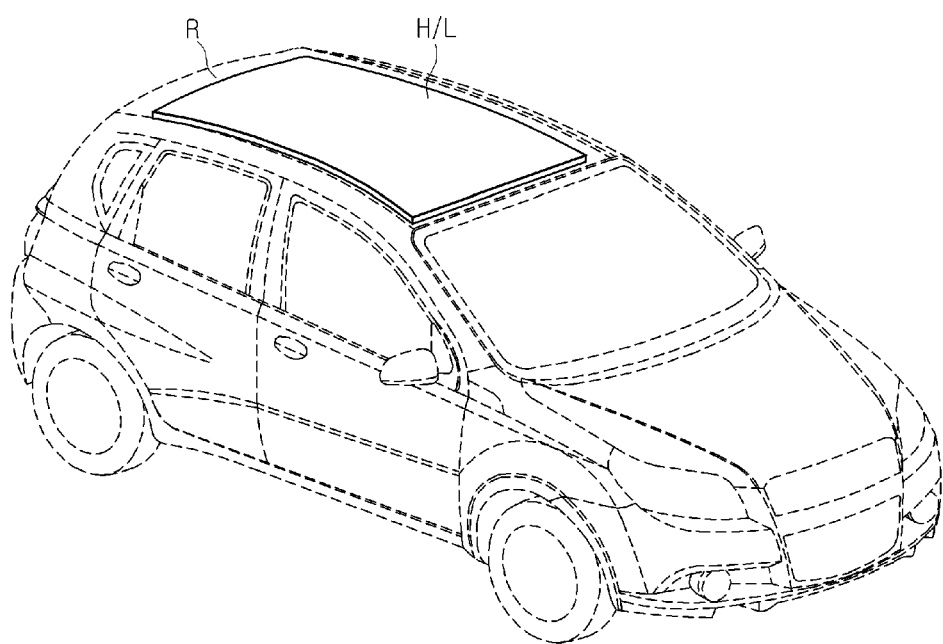
FIG. 1 is a perspective view of a vehicle showing a mounting position of a headliner.
Figure 2A:
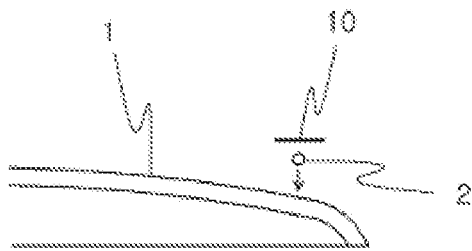
FIG. 2A shows a schematic view of a step of a method of mounting a cable on a headliner through a conventional method.
Figure 2B:
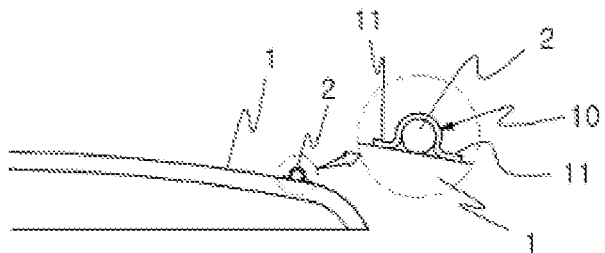
FIG. 2B shows a schematic view of a step of a method of mounting a cable on a headliner through a conventional method.
Figure 2C:
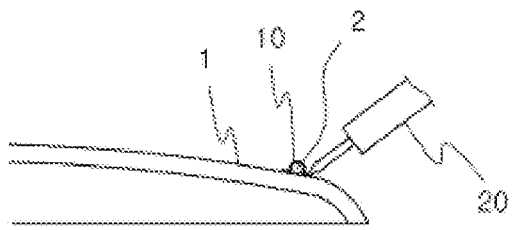
FIG. 2C shows a schematic view of a step of a method of mounting a cable on a headliner through a conventional method.
Figure 3:
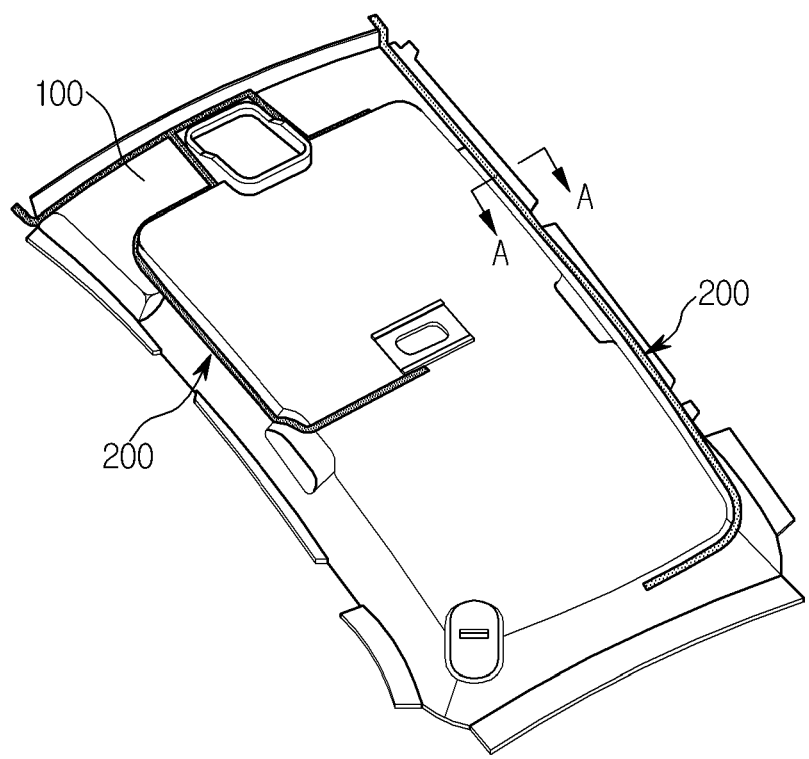
FIG. 3 is a perspective view showing a headliner on which a cable is mounted through a mounting method according to a first embodiment of the present invention.
Figure 4:
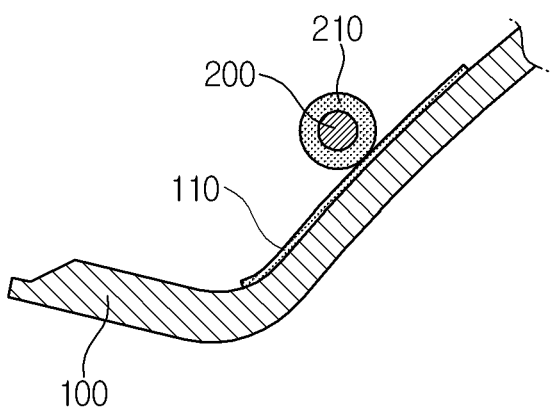
FIG. 4 is a cross-sectional view taken along line A-A of FIG. 3 showing a state in which the cable according to the first embodiment of the present invention is mounted.

As shown in FIGS. 3 and 4, in a method of mounting a cable on a headliner according to a first embodiment of the present invention, as a cable 200 is attached to a headliner 100 using attaching clothes 110 and 210, the cable 200 can be easily mounted, and even when the cable is mounted on an incorrect position, the cable can be easily separated therefrom and mounted thereon again. Accordingly, even an unskilled worker can easily attach the cable 200 to the headliner 100.

Hereinafter, the above-mentioned configuration will be more specifically described below.

As shown in FIG. 3, the headliner 100 is manufactured through a conventional method. In particular, the attaching cloth 110 is installed at the headliner 100 on which the cable 200 is mounted.

The attaching cloth 110 is mounted on one surface of the headliner 100, preferably, opposite to a roof panel. Here, the attaching cloth 110 may be integrally formed with the headliner 100 upon manufacture thereof, or may be configured to be attached to the headliner 100 through adhesion, fusion, or the like, which is a separate process after the manufacture.

In addition, in the exemplary embodiment of the present invention, the attaching cloth 110 can be easily attached to the headliner 100 using the planar attaching cloth, and an attachment range of the cable 200 may be set such that an attachment position can be selectively widened to a width of the attaching cloth 110. Here, "the planar attaching cloth" means a band-shaped attaching cloth, which is spread in a planar shape.

As shown in FIG. 3, the attaching cloth 110 is attached to one surface of the headliner 100 to conform to a wiring shape of the cable 200. In addition, the attaching cloth 110 may be used by attaching, for example, a female attaching cloth. The cable 200 means a conventional cable used in the vehicle to transmit data or a signal, supply power, or the like. The cable 200 is attached to the headliner 100, and for this, the attaching cloth 210 is installed at the cable 200.

While the attaching cloth 210 can be formed at one surface of the cable 200 in a band shape elongated in a longitudinal direction thereof, the circular attaching cloth may be used. Here, "the circular attaching cloth" means a member manufactured in a thin cylindrical shape to surround the cable 200 therein, or manufactured by winding a band-shaped attaching cloth on the cable 200, and manufactured in a male attaching cloth shape having an outer surface to which the attaching cloth 110 is adhered.

In the exemplary embodiment of the present invention, the circular attaching cloth may be manufactured in a cylindrical shape through a separate process and then the cable 200 may be inserted therein, or may be integrally manufactured with an outer case of the cable 200 upon manufacture of the outer case.

As shown in FIG. 4, the cable 200 is pressed in a state in which the attaching cloth 210 is in contact with the attaching cloth 110 of the headliner 100, completing the mounting of the cable 200. In FIG. 4, while the cable 200 is shown to be installed at a central portion in a widthwise direction of the attaching cloth 110, the position of the cable may be arbitrarily varied within a width of the attaching cloth 110.

A method of mounting a cable on a headliner according to a second embodiment of the present invention is distinguished from the first embodiment in that a configuration of the attaching cloth is different. Here, only differences in configuration will be described for the convenience of description.

That is, while the attaching cloth 110 attached to the headliner of the first embodiment uses the female attaching cloth, a male attaching cloth is used in the second embodiment. In addition, while the attaching cloth 210 attached to the cable of the first embodiment uses the male attaching cloth, a female attaching cloth is used in the second embodiment.

The cable according to the present invention can be easily attached using coupling and separation of the male and female attaching clothes, and can be easily separated and attached to a designated position again even when the cable is incorrectly assembled.

(Headliner)

Meanwhile, the present invention is configured to include a headliner to which a cable is attached using a mounting method using an attaching cloth.

As can be seen from the foregoing, the method of mounting a cable on a headliner and a headliner used therefor according to the present invention exhibit the following effects.

(1) Even when the noise pad is not added, since the attaching cloth functions as the noise pad, the cable can be fixed through a simple configuration.

(2) Since the assembly is easily completed by only pressing the cable against the planar attaching cloth of the headliner, even an unskilled worker can easily and rapidly assemble the cable.

(3) Even when the assembly position is slightly deviated, the cable can be pulled and then easily attached to a desired position again to be used.

(4) Since the cable attached to the headliner once cannot be easily separated from the attachment area, generation of noises due to separation of the cable or collision of the cable with the roof panel or the headliner can be prevented.

(5) Since the attachment process is simple as described above, productivity can be improved.

While the invention has been shown and described with reference to certain example embodiments thereof, it will be understood by those skilled in the art that various changes in form and details may be made therein without departing from the spirit and scope of the invention as defined by the appended claims.

What is claimed is:

1. A method of mounting a cable on a headliner, comprising:
preparing first and second attaching clothes at a mounting position of a headliner opposite to a roof panel and at which a cable is mounted, and at an outer circumferential surface of the cable, respectively; and
attaching and mounting the second attaching cloth installed at the cable onto the first attaching cloth installed at the headliner.

2. The method of mounting the cable on the headliner according to claim 1, wherein the first attaching cloth is a planar attaching cloth, and
the second attaching cloth is a circular attaching cloth configured to surround an outer surface of the cable.

3. The method of mounting the cable on the headliner according to claim 2, wherein the first attaching cloth is a female attaching cloth, and
the second attaching cloth is a male attaching cloth.

4. The method of mounting the cable on the headliner according to claim 2, wherein the first attaching cloth is a male attaching cloth, and
the second attaching cloth is a female attaching cloth.

5. A headliner on which a cable is mounted through the method of claim 1.

6. The method of mounting the cable on the headliner according to claim 1, further comprising the step of separating an incorrectly attached cable from the headliner and then attaching the cable thereto.

7. The method of mounting the cable on the headliner according to claim 1, wherein the first attaching cloth is integrally formed with the headliner.

8. The method of mounting the cable on the headliner according to claim 1, wherein the first attaching cloth is attachable to the headliner.

9. The method of mounting the cable on the headliner according to claim 8, wherein the first attaching cloth is attached with the headliner through adhesion or fusion.

10. The method of mounting the cable on the headliner according to claim 2, wherein the circular attaching cloth configured to surround the outer surface of the cable is prepared by winding a band-shaped attaching cloth on the cable.

11. The method of mounting the cable on the headliner according to claim 2, wherein the circular attaching cloth configured to surround the outer surface of the cable is prepared by manufacturing the second attaching cloth in a cylindrical shape and inserting the cable into the second attaching cloth.

* * * * *